US007197376B2

(12) United States Patent
Berdelle-Hilge

(10) Patent No.: US 7,197,376 B2
(45) Date of Patent: Mar. 27, 2007

(54) MAIL PROCESSING SYSTEM AND METHOD OF DELIVERING MAIL ITEMS TO DELIVERY LOCATION THEREIN

(75) Inventor: Peter Berdelle-Hilge, Constance (DE)

(73) Assignee: Siemens AG, München (DE)

( * ) Notice: Subject to any disclaimer, the term of this patent is extended or adjusted under 35 U.S.C. 154(b) by 291 days.

(21) Appl. No.: 10/933,343

(22) Filed: Sep. 3, 2004

(65) Prior Publication Data

US 2005/0061615 A1 Mar. 24, 2005

Related U.S. Application Data

(60) Provisional application No. 60/499,612, filed on Sep. 3, 2003.

(51) Int. Cl.
*G06F 7/00* (2006.01)

(52) U.S. Cl. ...................................... 700/226; 700/225

(58) Field of Classification Search ................ 700/214, 700/215, 225, 226, 228, 230; 198/349, 890, 198/891, 617, 341.01, 347.4; 414/809; 209/900
See application file for complete search history.

(56) References Cited

U.S. PATENT DOCUMENTS 5,051,914 A * 9/1991 Sansone et al. ............. 700/223
5,068,797 A * 11/1991 Sansone et al. ............. 700/219
5,154,246 A * 10/1992 DiGiulio et al. ......... 177/25.15
5,422,821 A * 6/1995 Allen et al. ................. 700/219
5,508,818 A * 4/1996 Hamma ...................... 358/403
6,539,098 B1 * 3/2003 Baker et al. ................ 382/101
6,953,906 B2 * 10/2005 Burns et al. ................ 209/584
7,004,396 B1 * 2/2006 Quine et al. ................ 235/475

* cited by examiner

*Primary Examiner*—Douglas Hess
(74) *Attorney, Agent, or Firm*—Siemens AG

(57) ABSTRACT

In a mail processing system that delivers articles to delivery locations a first transport vehicle at a first loading point is loaded with a first article, and guided along a first delivery path to a first delivery location. A second transport vehicle at a second loading point is loaded with a second article, and guided along a second delivery path to a second delivery location. Depending on a determination of whether the first and second transport vehicles deliver the first and second articles to the respective first and second delivery locations, the method returns an empty transport vehicle to the nearest one of the loading points and bypasses one of the first and second loading points for a still loaded transport vehicle. This allows to minimize the number of transport vehicles within the system.

10 Claims, 6 Drawing Sheets

MAIL PROCESSING SYSTEM AND METHOD OF DELIVERING MAIL ITEMS TO DELIVERY LOCATION THEREIN

CROSS REFERENCE TO RELATED APPLICATIONS

The present application claims priority to provisional patent application Ser. No. 60/499,612 filed on Sep. 3, 2003, which is herein incorporated by reference.

BACKGROUND OF THE INVENTION

The various embodiments described herein relate to a mail processing system and a method of delivering articles to delivery locations within the mail processing system.

Each day the United States Postal Service (USPS) processes articles for delivery to millions of individual domestic addresses. As used throughout the application, articles refer to mail items, magazines, books and other such flat items. Before mail carriers begin to walk through or drive through their delivery routes, a mail processing system at a USPS processing site sorts all articles for the carriers and packages the sorted articles for each domestic address. A carrier's responsibility includes putting all of these articles into an appropriate sequence for efficient delivery to the domestic addresses.

The mail processing system is highly automated to handle the amount of daily articles. It includes a delivery point packaging (DPP) system that, for example, separates the articles, reads their destination addresses and groups the articles based upon their respective destination addresses. One example of a DPP system includes an arrangement of a multitude of individual pockets or slots for individual articles. A transport system transports the articles along a track system to the slots. Feeders insert the articles into the transport system at loading points. At this point, the destination address of an article is known and the transport system transports the article along a delivery path to a slot that is pre-assigned to the destination address of that article.

SUMMARY OF CERTAIN INVENTIVE ASPECTS

A general aspect of a mail processing system is to operate it as efficient and reliable as possible and as inexpensive as possible to the USPS. One parameter that influences efficiency, reliability, and operating costs is the number of vehicles traveling within the DPP system. Reducing the number of traveling vehicles improves efficiency and reliability and reduces operating cost. It is, therefore, an objective to provide a mail processing system that operates with a reduced number of vehicles.

Accordingly, one aspect involves a method of delivering articles to predetermined delivery locations within a mail processing system. The method loads a first transport vehicle at a first loading point with a first article, and guides the first transport vehicle along a first delivery path towards a first delivery location. A second transport vehicle is loaded at a second loading point with a second article, and guided along a second delivery path towards a second delivery location. The method determines if the first transport vehicle delivers the first article at the first delivery location and if the second transport vehicle delivers the second article at the second delivery location. The first transport vehicle is guided to the second loading point if it delivered the first article at the first delivery location, and the second transport vehicle is guided to the first loading point if it delivered the second article at the second delivery location. Further, the method guides the first transport vehicle to the second delivery location if it did not deliver the first article at the first delivery location, and the second transport vehicle to the first delivery location if it did not deliver the second article at the second delivery location.

Another aspect involves a mail processing system having a predetermined number of casing towers arranged in parallel, wherein each casing tower has a plurality of slots to receive articles. A first feeder at a first loading point load a first transport vehicle with a first article, and a second feeder at a second loading point loads a second transport vehicle with a second article. A transport system is associated with the casing towers and the first and second feeders and configured to guide the first and second transport vehicles along delivery paths to respective first and second delivery locations, wherein the transport system is further configured to determine whether the first and second transport vehicles deliver the first and second articles to the respective first and second delivery locations, to guide an empty transport vehicle to one of the loading points and to guide a still loaded first transport vehicle to the second delivery location and a still loaded second transport vehicle to the first delivery location.

A further aspect involves a method of delivering articles to predetermined delivery locations within a mail processing system. The method includes inserting a first article at a first loading point into a first delivery path, and a second article at a second loading point into a second delivery path. The first and second articles are transported towards the first and second delivery locations, respectively. The first delivery location is by-passed if the first delivery location does not include a destination address that corresponds to an address of the first article. Further, the second delivery location is by-passed if the second delivery location does not include that corresponds to an address of the second article.

A still further aspect involves a method of delivering articles to predetermined delivery locations within a mail processing system. The method includes inserting a first article at a first loading point into a first delivery path, and transporting the first article towards the first delivery location. The method determines if a delivery of the first article at the first delivery location occurs, and transports the first article to a second delivery location if a delivery of the first article did not occur at the first delivery location.

BRIEF DESCRIPTION OF THE DRAWINGS

These and other aspects, advantages and novel features of the embodiments described herein will become apparent upon reading the following detailed description and upon reference to the accompanying drawings. In the drawings, same elements have the same reference numerals.

DETAILED DESCRIPTION OF CERTAIN INVENTIVE EMBODIMENTS

Figure 1:
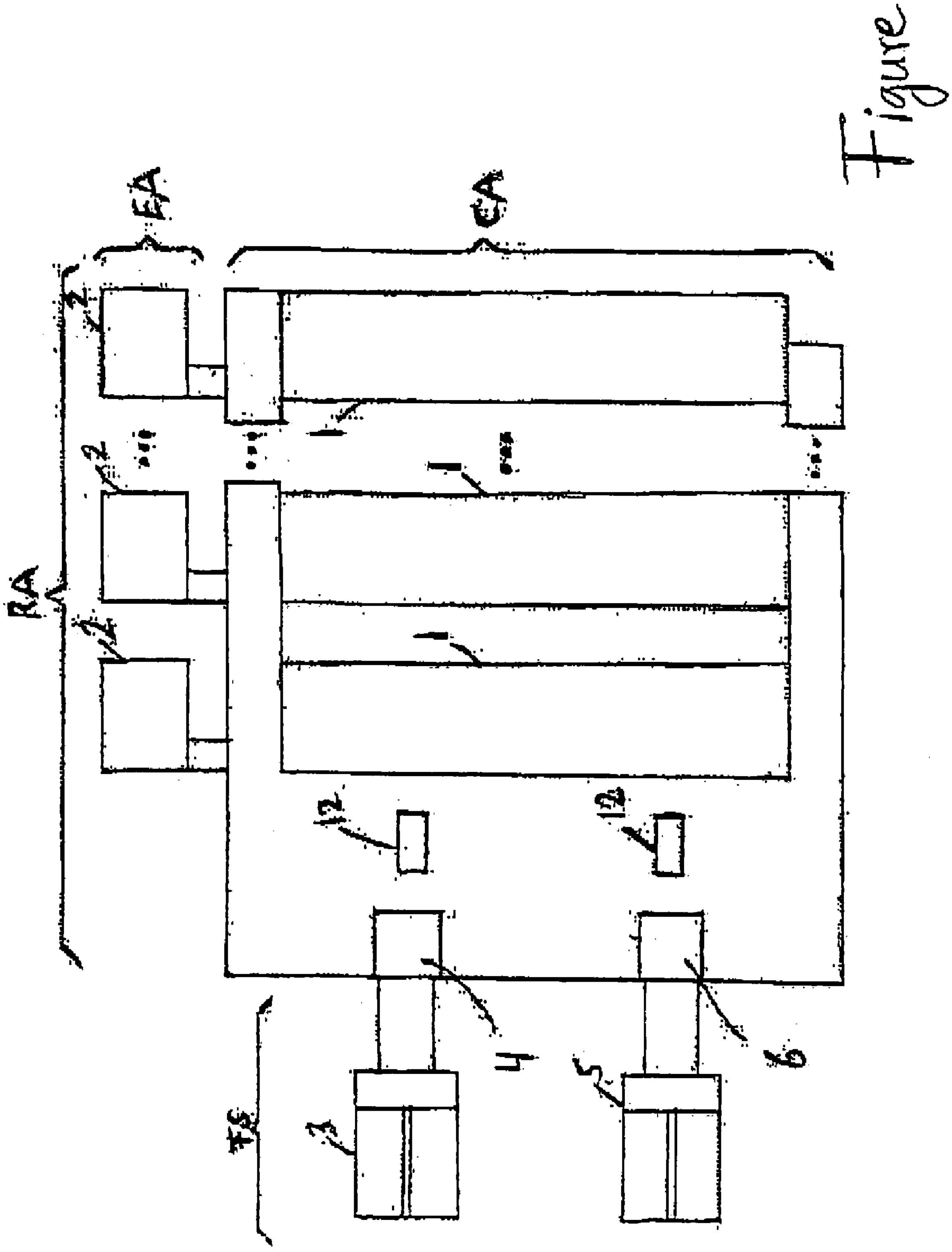
FIG. 1 shows a schematic overview of one embodiment of a mail processing system.

FIG. 1 shows a schematic illustration of one embodiment of a mail processing system to provide for a general overview of a mail processing system. The illustration depicts basic flows and functional relationships within the system. These basic flows and functional relationships are represented in FIG. 1 through functional blocks for a feeding section FS, a routing area RA, a casing area CA and an extraction area EA. These functional blocks represent some of the main functional features of the system. Those of ordinary skill in the art of mail processing systems will appreciate that the system includes a variety of other functional features. Further, it is contemplated that the separation into these functional blocks is arbitrary and that the blocks may be shown in a different arrangement without affecting the principal operation of the system. A more detailed description of one embodiment of the system and its structural components follows.

Briefly, the feeding section FS separates individual articles from batches to identify their individual destination addresses. For that purpose, the feeding section FS includes in one embodiment feeders 3, 5 and optical character readers (OCR) or bar code readers, or a combination of these readers. After successful identification of the destination addresses, the feeder section FS hands the articles to the routing area RA. The routing area RA includes an infrastructure that transports the articles according to their destination addresses to the casing area CA. The infrastructure includes, among other elements, elevators and transport vehicles 12, for example, automatic inserter transport vehicles, hereinafter referred to as ANT(s) 12. In one embodiment, the system may include several hundred ANTs 12. The casing area CA is embedded in the routing area RA and includes a predetermined number of casing towers 1 that have slots for the articles. Each slot represents an individual destination address. Once the articles are delivered to the slots extraction and packaging modules 2 in the extraction area EA extract the articles from the slots and pack the articles on a per destination address basis.

Figure 2:
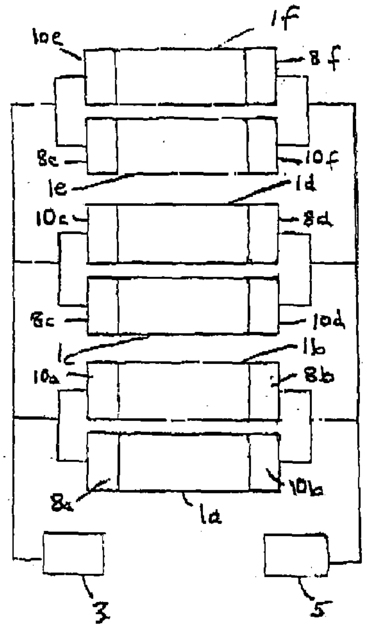
FIG. 2 illustrates a topology formed by loops.

The various embodiments of the mail processing system described hereinafter relate mainly to the feeder, routing and casing areas. FIG. 2 illustrates a topology that may be implemented within these areas of a mail processing system similar to the one shown in FIG. 1. The illustrated topology is based upon using casing towers 1*a*, 1*b*, 1*c*, 1*d*, 1*e*, 1*f*, two feeders 3, 5 and a transport system associated with the casing towers 1*a*, 1*b*, 1*c*, 1*d*, 1*e*, 1*f* and the feeders 3, 5. The topology includes three loops, i.e., per loop there are two casing towers 1*a*, 1*b*, 1*c*, 1*d*, 1*e*, 1*f* arranged in parallel, and the feeders 3, 5 located at different loading points and coupled to the loops.

Within each loop, the casing towers 1*a*, 1*b*, 1*c*, 1*d*, 1*e*, 1*f* having a predetermined number of available slots. For example, considering two casing towers 1*a*, 1*b* the available slots and, hence, the delivery addresses, are about equally divided between the two casing towers 1*a*, 1*b*. The casing tower 1*a* may comprise the first half of the delivery addresses and the casing tower 1*b* may comprise the second half of the delivery addresses.

Further, each loop includes merge elevators 8*a*, 8*b* and divert elevators 10*a*, 10*b*, wherein a divert elevator 10*a*, 10*b* is located at an entry side of a casing tower 1*a*, 1*b*, 1*c*, 1*d*, 1*e*, 1*f* and a merge elevator 8*a*, 8*b* is located at an exit side of a casing tower 1*a*, 1*b*, 1*c*, 1*d*, 1*e*, 1*f*. The transport system couples the feeders 3, 5 to the loops to deliver the articles to the casing towers 1*a*, 1*b*, 1*c*, 1*d*, 1*e*, 1*f*. The transport system includes in one embodiment the ANTs 12, switches, re-circle lines and exception lines as described below.

For example, if the feeder 3 inserts a article for delivery to a designated slot within one of the casing towers 1*b*, 1*d*, 1*f* the ANT 12 travels along a rail system changing tracks via one or more of the switches and/or changing levels until it reaches the designated slot. In one embodiment, the empty ANT 12 returns to the feeder 5. Similarly, if the feeder 5 inserts an article for delivery to the designated slot within one of the casing towers 1*a*, 1*c*, 1*e* the ANT 12 travels along the rail system until it reaches its destination for delivery. The empty ANT 12 returns in one embodiment to the feeder 3.

Figure 3:
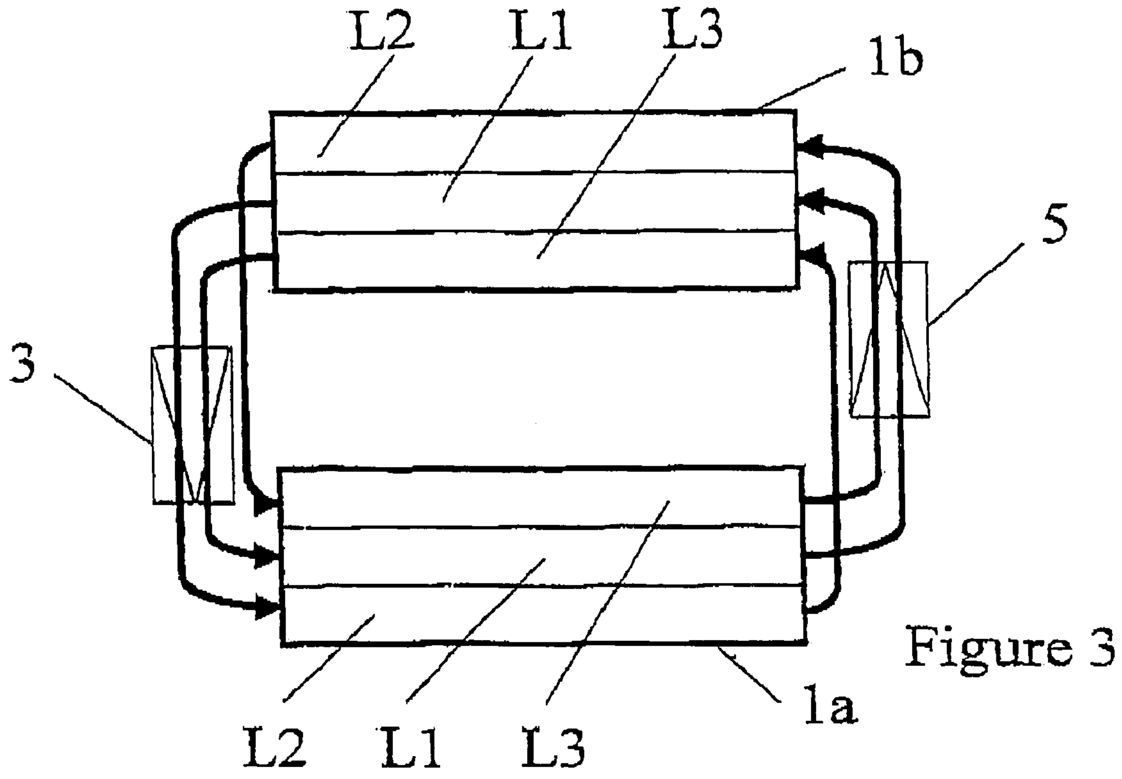
FIG. 3 illustrates a first structure comprising two casing towers and two feeders coupled to the casing towers.

FIG. 3 is an illustration of-two parallel casing towers 1*a*, 1*b* coupled to the feeders 3, 5. The casing towers 1*a*, 1*b* of this illustration include lanes and several paths couple the casing towers 1*a*, 1*b* to the feeders 3, 5. Note, however, that these lanes and paths are only shown for explanatory purposes. For each casing tower 1*a*, 1*b* three lanes L1, L2, L3 are shown to represent three possible scenarios in each casing tower 1*a*, 1*b:*

1) Assuming, for example, a loaded ANT 12 departs from the feeder 3 and heads towards the casing tower 1*a*, if the delivery address is within the casing tower 1*a*, the ANT 12 delivers the article to the assigned slot, as represented through lane L1, and leaves the casing tower 1*a* empty to be reloaded by the feeder 5.
2) Again under the assumption of Scenario 1, if the delivery address is not within the casing tower 1*a*, the ANT 12 cannot deliver the article, as represented through lane L2, and the still loaded ANT 12 leaves the casing tower 1*a* to be routed to the casing tower 1*b*, but by-passing the feeder 5. As the second half of the delivery addresses is within the casing tower 1*b*, it is likely the ANT 12 can deliver the article, as represented through lane L3 in the casing tower 1*b*, and leave the casing tower 1*b* empty to be reloaded by the feeder 3.
3) Lane 3 of a particular casing tower, for example, casing tower 1*b* represents a situation where an ANT 12 could not deliver its article in the other casing tower, for example, in casing tower 1*a*.

These scenarios illustrate that an ANT 12 that delivered its article leaves a casing tower 1*a*, 1*b* as soon as possible to be re-loaded. In Scenario 1, for example, the ANT 12 exits the casing tower 1*a* instead of having to travel empty along the slots assigned to the second half of the delivery addresses. The empty ANT 12 is then re-loaded by the feeder 5 and begins its delivery trip anew. Only if the ANT 12 cannot make a delivery (Scenario 2), the ANT 12 enters the next casing tower, here casing tower 1*b*, and has to travel past the second half of the addresses. A still loaded ANT 12 by-passes the feeder 3, 5. It is contemplated that the foregoing scenarios apply equally to situations where the ANT 12 departs from the feeder 5.

FIG. 3 allows evaluating the improvement available in a system having a structure as depicted. There are two feeders 3, 5 located at two different loading points. Further, for each casing tower 1*a*, 1*b*, it is assumed that there are three different kinds of ANTs 12 corresponding to the three scenarios. For example, for the casing tower 1*a*, there are two kinds of ANTs 12 ("delivering" and "not delivering") from the feeder 1 and one kind originating from the feeder 2 and "not delivering" in the casing tower 1*b*. Note that the reference to "different kinds of ANTs 12" is for explanatory purposes only. Assuming each casing tower 1*a*, 1*b* has a constant throughput V (ANTs per time unit), two thirds (2/3 V) of the casing tower's throughput is available to the two kinds of ANTs 12 from the same feeder. A third of the casing tower's throughput (i.e., 1/3 V) is available to the third kind of ANTs 12. For each casing tower 1*a*, 1*b*, 2/3 of the throughput is available to the ANTs 12 originating from one feeder 3, 5. With two feeders 3, 5 and two casing towers 1*a*, 1*b*, a total throughput of 4/3 V results. Hence, assuming the number of ANTs 12 remains constant, the structure of FIG. 3 provides for about 33% increase in throughput. Or, assuming the throughput remains constant, the optimization method provides for about 25% decrease in the required number of ANTs 12, for example, because an ANT 12 originating from the feeder 5 and delivering its article in the casing tower 1*b* has to travel through a casing tower that is half as long as a conventional straight casing tower.

Figure 4:
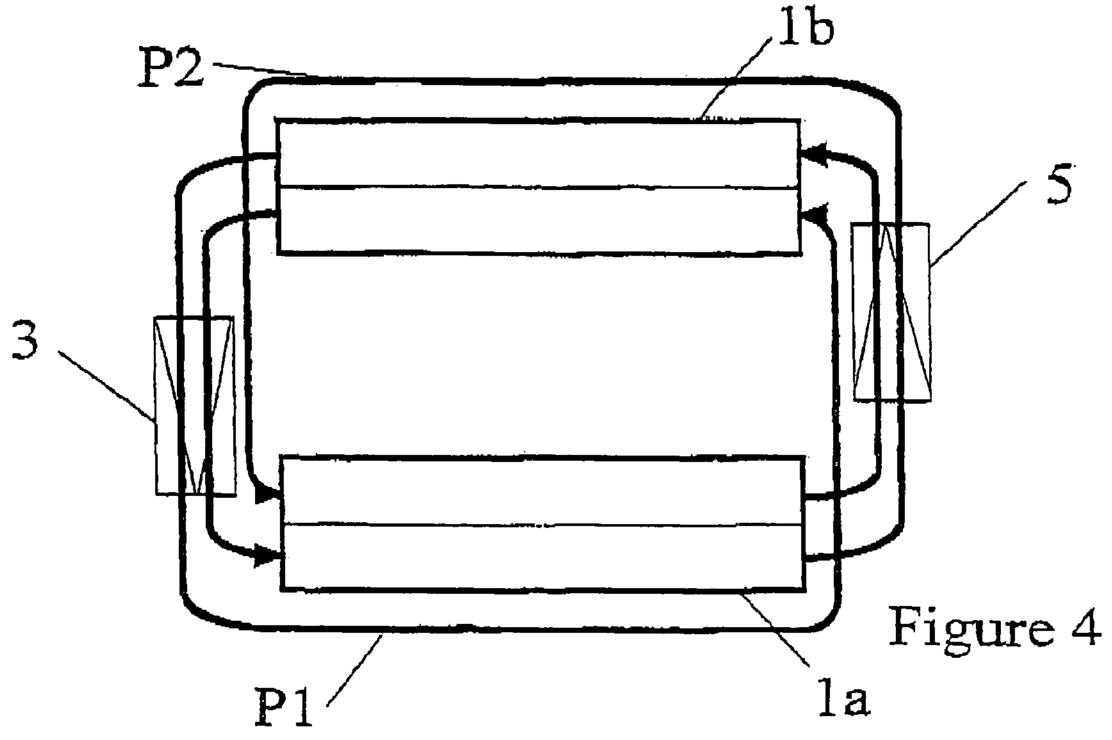
FIG. 4 illustrates a second structure comprising two casing towers and two feeders coupled to the casing towers.

FIG. 4 is an illustration of two parallel casing towers 1*a*, 1*b* coupled to the feeders 3, 5, similar to the structure shown in FIG. 3. Unlike in the structure of FIG. 3, the structure of FIG. 4 has paths P1, P2 that allow an ANT 12 to by-pass a casing tower 1*a*, 1*b*. For example, an ANT 12 departing from the feeder 3 does not enter the casing towers 1*a* if the delivery address is not within the casing tower 1*a* comprising, for example, the first half of the addresses. Instead, the loaded ANT 12 travels along the path P1, by-passes the casing tower 1*a*, and enters the casing tower 1*b* that includes the second half of the delivery addresses. Upon delivery of the article within the second half of the delivery addresses, the ANT 12 exits the casing tower 1*b*. It is contemplated that the same applies when the ANT 12 departs from the feeder 5 and by-passes the casing tower 1*b* on path P2.

The structure of FIG. 4 provides similar advantages regarding the improvement of the throughput as the structure of FIG. 3. In addition, the structure of FIG. 4 avoids that ANTs 12, which do not have to make a delivery within a casing tower 1*a*, 1*b*, enter this casing tower. This is an improvement over the embodiment shown in FIG. 3, where all ANTs 12 have to wait while one ANT 12 makes a delivery.

The shown structures minimize the path lengths the ANTs 12 have to travel in order to reduce the number of ANTs 12 within the system. The number of ANTs 12 is determined with the following equation:

$$\#ANTs=(\text{Throughput}\times L_{path})V_{ANT},$$

wherein:

throughput is the number of mail pieces per time unit passing through the system, $L_{path}$ is the average path length for an ANT, and $V_{ANT}$ is the velocity of the ANTs.

Considering that the mail processing system may include several hundred ANTs 12, e.g. 400–700 ANTs, the objective is, for example, to determine the minimum number of ANTs 12 required in the system. The throughput is usually desired to be as high as possible and as such not a parameter that an operator reduces without need. One parameter that can be varied to influence the number of ANTs 12 is the path length $L_{path}$ an ANT 12 has to travel. The shorter the path length, the lower the number of required ANTs 12. Another parameter that can be varied within a certain range is the velocity of the ANTs 12. The faster the ANTs 12 travel, the lower the number of required ANTs 12. If the path lengths the ANTs 12 have to travel are optimized, the velocity of the ANTs 12 is an additional parameter for adjustment.

Figure 5:
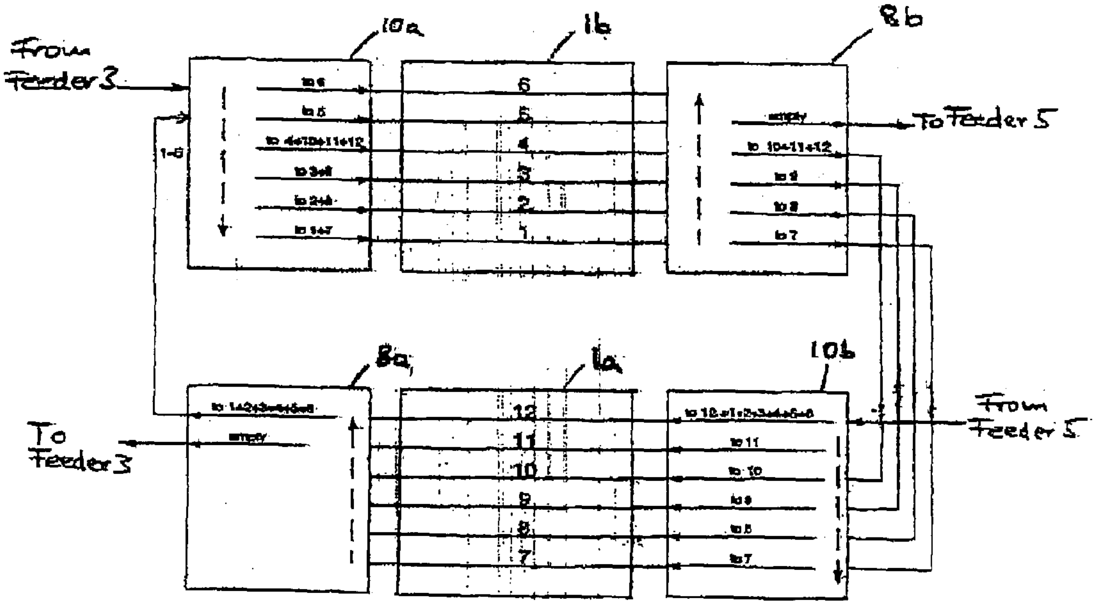
FIG. 5 illustrates one embodiment of a loop included in the structure shown in FIG. 2.

FIG. 5 illustrates one embodiment of a loop shown in FIG. 2 including the casing towers 1*a*, 1*b*, the divert elevators 10*a*, 10*b* and the merge elevators 8*a*, 8*b*. It is contemplated that FIG. 5 shows side views of the casing towers 1*a*, 1*b* and the elevators 8*a*, 8*b*, 10*a*, 10*b*. These elevators 8*a*, 8*b*, 10*a*, 10*b* move vertically only one level per operation, wherein the divert elevators 10*a*, 10*b* generally move downwards, and the merge elevators 8*a*, 8*b* generally move upwards. In operation, the ANTs 12 are queued in front of the elevators, and the divert elevators 10*a*, 10*b* receive the ANTs 12 from the feeders 3 and 5, respectively, wherein the ANTs 12 proceed from the merge elevators 8*a*, 8*b* to the feeders 3, 5, respectively, or the divert elevators 10*a*, 10*b*, respectively.

Each casing tower 1*a*, 1*b* has six levels. The illustrated loop, therefore, has twelve regions. For ease of description, all destinations (i.e., slots) within one region are identified in FIG. 4 by the number (1 to 12) of the region. For example, destination slot numbers 1 to 555 are located in region 1 (i.e., level 1 of casing tower 1*b*), destination slot numbers 556 to 1110 are located in region 2, and so on.

Referring initially to the divert elevator 10*a*, the ANTs 12 coming from the feeder 3 enter the divert elevator 10*a* on the $6^{th}$ level. The divert elevator 10*a* moves the ANTs 12 from the $6^{th}$ level down one level at a time. The ANTs 12 can have all slots of the casing tower 1*b* as destinations. If the destinations are within the casing tower 1*b* the ANTs 12 exit the divert elevator 10*a* at the assigned level and proceed to the designated slot within that level to deliver the article.

For example, assuming an ANT 12 enters the divert elevator 10*a* on the $6^{th}$ level, if the ANTs 12 destination is in the region 6 it passes through and another ANT 12 enters from level 6. If the destination in another region, the ANT 12 is stopped in the divert elevator 10*a*. The divert elevator 10*a* indexes one level down. If any ANT 12 is in the divert elevator 10*a* that has reached its target level, this ANT 12 leaves the divert elevator 10*a*. A new ANT 12 enters on the $6^{th}$ level and the procedure is repeated. Further, if an ANT 12 from the feeder 3 has been delivered to level 5, a new ANT 12 is allowed to enter on level 5, e.g., coming from the merge-elevator 8*a*, while the other ANT 12 exits to region 5. If the new ANT 12 does not have to go up to level 6, an ANT 12 from the feeder 3 can enter the divert elevator 10*a* in parallel on level 6. Depending on the throughput of the divert elevator 10*a* on level 5 there may be times when no ANT 12 is allowed to enter on level 6 and a gap is generated on level 5 by indexing the divert elevator 10*a* downward twice.

In FIG. 5, the feeder 3 loaded the ANTs 12 with articles for twelve regions. Those ANTs 12 delivering articles to the regions 1–6 within the casing tower 1*b* exit the divert elevator 10*a* at the appropriate level and deliver these articles. The empty ANTs 12 enter the merge elevator 8*b*. If the destinations are not within the casing tower 1*b*, certain levels are used for transferring the ANTs 12. All ANTs 12 going to region 10, 11 and 12 are put on level 4. The ANT 12 for region 9 is put to level 3, the ANT 12 for region 8 on level 2 and the ANT 12 for region 7 on level 1 within the casing tower 1*b*. Under certain circumstances, ANTs 12 for regions 11 and 12 may not only be deployed to level 4, but to levels 1–3 as well, for example, if level 4 is blocked or is getting busy.

The ANTs 12 coming from the feeder 5 via the merge elevator 8*a*, i.e., those ANTs 12 with destinations in the regions 1–6 of the casing tower 1*b* and as such not emptied within the casing tower 1*a*, enter the divert elevator 10*a* on the 5$^{th}$ level and proceed to the corresponding levels 1 to 6. Under certain circumstances, e.g., for balancing reasons, empty ANTs 12 may enter on level 5. These empty ANTs 12 stay on level 5 and pass the divert elevator 10*a* without a vertical move if that level is not blocked or busy. If an ANT 12 enters the divert elevator 10*a* on level 6 and does not have a final destination address (no read), the ANT 12 is assigned to a level.

Referring to the merge elevator 8*b*, the ANTs 12 coming from the levels 5 and 6 of the casing tower 1*b* are empty. The empty ANTs 12 are transferred to level 5 and leave the merge elevator 8*b* to be re-loaded at the feeder 5. The ANTs 12 coming from the other levels 1–4 are empty if their destinations were within the levels 1–4. In that case, these ANTs 12 are transferred to level 5 as well to leave the merge elevator 8*b* for the feeder 5. Full ANTs 12 from the levels 1–4 (i.e., ANTs 12 with destinations in the regions 7–12) pass the merge elevator 8*b* without a vertical move and proceed to the divert elevator 10*b*. Under certain circumstances, empty ANTs 12 may proceed to the feeder 3. These ANTs 12 are transferred to the level 4 or to levels 3–1.

If an ANT 12 transports a "no read" article, this ANT 12 obtains its final target destination before entering the merge elevator 8*b*. If the final target destination is outside the loop the ANT 12 leaves the merge elevator 8*b* on level 5. If it is within the following casing tower, e.g., casing tower 1*a*, the ANT 12 proceeds as described. If the ANT 12 has to go back to the other casing tower, e.g., casing tower 1*b*, the ANT 12 is assigned to a level that leads, for example, to the divert-elevator 10*a*.

Referring to the divert elevator 10*b*, the ANTs 12 from the feeder 5 enter the divert elevator 10*b* on level 6. If the destination of an ANT 12 is one of the regions 7–12 the ANT 12 is transferred to the corresponding level of the casing tower 1*a*. If the destination is within the regions 1-6 of the casing tower 1*b* the ANT 12 can pass the divert elevator 10*b* without a vertical movement on level 6. Under certain circumstances, the 6$^{th}$ level may be blocked or get busy. In that case, the ANTs 12 may use the 5$^{th}$ level and the other levels.

The ANTs 12 coming from the merge elevator 8*b* on levels 1–3 have destinations for the regions on the same levels (i.e., 1–3), enter the divert elevator 10*b* and pass the divert elevator 10*b* without vertical movement. The ANTs 12 entering on the 4$^{th}$ level proceed in a similar manner if the ANTs 12 have destinations for the region 10. If the ANTs 12 have destinations in the regions 11 or 12, the ANTs 12 are transferred vertically to the proper levels 5 or 6. If an ANT 12 enters the divert elevator 10*b* on level 6 and does not have a final destination address ("no read"), the ANT 12 is assigned to a level.

Referring to the merge elevator 8*a*, all empty ANTs 12 are to be transferred to level 5 where they leave the merge elevator 8*a* for the feeder 3. Under certain circumstances, some ANTs 12 may proceed to the feeder 5. In that case, those ANTs 12 are moved to level 6. All loaded ANTs 12, which have destinations in regions 1 to 6 only, are transferred to the level 6 for delivery via the divert elevator 10*a*. If an ANT 12 has a "no read" article, this ANT 12 obtains its final target destination before entering the merge elevator 8*a*. If the final target destination is outside the loop the ANT 12 leaves the merge elevator 8*a* on level 5, otherwise that ANT 12 is transferred to level 6.

Figure 6:
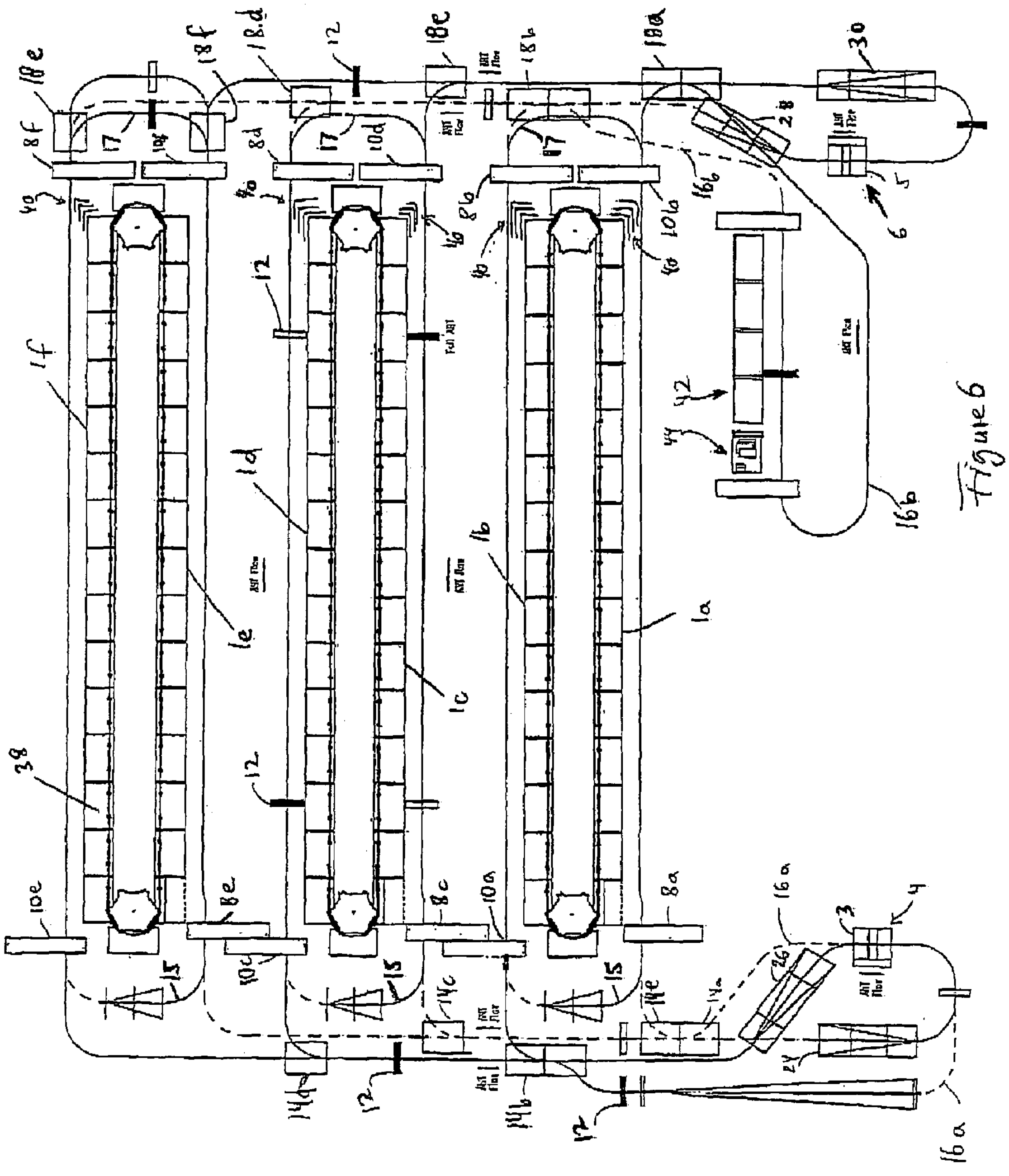
FIG. 6 illustrates one embodiment of a schematic mail processing system implementing the structure illustrated in FIG. 3.

FIG. 6 illustrates one embodiment of a schematic mail processing system implementing the structure illustrated in FIG. 3. The illustrated embodiment of the system includes the casing tower arrangement 1*a*, 1*b*, 1*c*, 1*d*, 1*e*, 1*f*, ANTs 12, merge elevators 8*a*, 8*b*, 8*c*, 8*d*, 8*e*, 8*f* each assigned to a respective casing tower 1*a*–1*f*, and divert elevators 10*a*, 10*b*, 10*c*, 10*d*, 10*e*, 10*f* each also assigned to a respective casing tower arrangement 1*a*–1*f*. The system includes further by-passes 15, 17, switches 14*a*, 14*b*, 14*c*, 14*d*, 14*e*, 18*a*, 18*b*, 18*c*, 18*d*, 18*e* that allow an ANT 12 to change tracks, ramp devices 24, 26, 28, 30 that allow an ANT 12 to change levels. In one embodiment, the by-passes 15, 17 include ramp devices. A track system interconnects these elements of the system as described below in connection with a description of the operation of the system.

Note that FIG. 6 shows a top view of the casing towers 1*a*–1*f* so that various sections 38 with containers are visible. It is contemplated that each casing tower 1*a*–1*f* has several levels (e.g., level 1 . . . level 6). For ease of illustration, FIG. 6 indicates these levels only in an area 40 of the illustrated casing towers 1*a*–1*f*. It is contemplated, however, that each level has a substantially identical structure.

The feeder 3 loads an ANT 12 with a single article at the loading point 4. Note that FIG. 6, as well as the following drawing, show a loaded ANT 12 for illustrative purposes as a filled rectangle and an empty or unloaded ANT 12 as an unfilled rectangle. The ramp 26 moves the ANT 12 to level 6, and switches 14*a*, 14*c* distribute the ANT 12 to one of the three loops depending on the destination of the article contained in the ANT 12. The ANT 12 proceeds to one of the divert elevators 10*a*, 10*c*, 10*e* to enter the casing tower 1*b*, 1*d* or 1*f* on the 6$^{th}$ level. The ANT 12 proceeds then to the six levels in the casing tower 1*b*, 1*d* or 1*f*. When the ANT 12 reaches one of the merge elevators 8*b*, 8*d*, 8*f* the ANT 12 is empty if the destination address was within the casing towers 1*b*, 1*d*, 1*f* the ANT 12 passed. The ANT 12 leaves the loop through the merge elevator 8*b*, 8*d*, 8*f* on the 5$^{th}$ level and proceeds to the loading point 6 via switches 18*e*, 18*b*, 18*d* and a ramp 28. If the ANT 12 is not empty, the ANT 12 proceeds via the by-pass 17 to one of the divert elevators 10*b*, 10*d*, 10*f* and enters one of the casing towers 1*a*, 1*c*, 1*e*. Once the ANT 12 reaches one of the merge elevators 8*a*, 8*c*, 8*e* the ANT 12 should be empty and leaves the loop via the 5$^{th}$ level of the merge elevator 8*a*, 8*c*, 8*e*. The ANT 12 proceeds via switches 14*c*, 14*e*and the ramp 24 to the loading point 4.

Similar to the feeder 3, the feeder 5 at the loading point 6 loads an ANT 12 with a single article. The ramp 30 moves the ANT 12 to level 6 and switches 18*a*, 18*c*, 18*f* distribute the ANT 12 to one of the three loops depending on the destination address of the article contained on the ANT 12. The ANT 12 proceeds to one of the divert elevators 10*b*, 10*d*, 10*f* on the 6$^{th}$ level. The ANT 12 proceeds then to the six levels in the casing tower 1*a*, 1*c*, 1*e*. When the ANT 12 reaches one of the merge elevators 8*a*, 8*c*, 8*e* the ANT 12 is empty if the destination address was within the casing tower 1*a*, 1*c*, 1*e* passed and leaves the loop through the merge elevator 8*a*, 8*c*, 8*e* on the 5$^{th}$ level. The ANT 12 proceeds to the loading point 4 via switches 14*c*, 14*f*, 14*e* and the ramp 24. If the ANT 12 is not empty, the ANT 12 proceeds via the by-pass 15 to one of the divert elevators 10*a*, 10*c*, 10*e* and enters one of the casing towers 1*b*, 1*d*, 1*f*. Once the ANT 12 reaches one of the merge elevators 8*b*, 8*d*, 8*f* the ANT 12 should be empty and leaves the loop via the 5$^{th}$ level of the merge elevator 8*b*, 8*d*, 8*f*. The ANT 12 proceeds via switches 18 *e*, 18*d*, 18*b* and the ramp 28 to the loading point 6.

In one embodiment the system provides for re-circle lines 16*a*, 16*b*. If an ANT 12 has to leave one loop for another loop, for example, after getting an address reading that was previously not available or not correct, the ANT 12 leaves a merge elevator on the $5^{th}$ level and proceeds to one of two exception loops formed by the re-circle lines 16*a*, 16*b* in proximity of the loading points 4, 6. If the ANT 12 leaves the exception loop, it is merged to the usual flow of ANTs 12 coming from the feeders 3, 5 next to that exception loop.

In the illustrated embodiment the system provides further for an exception line. In one embodiment, the re-circle line 16*b* acts as the exception line. The exception line is for articles (e.g., misfaced, out of sorting scheme, no read) for which a regular sorting in the casing towers 1*a*, 1*b*, 1*c*, 1*d*, 1*e*, 1*f* may not be appropriate. Such articles are directed to the exception line/re-circle line 16*b* near the loading point 6, where the ANTs 12 drop the exception articles in outlet bins 42. Included in the exception line/re-circle line 16*b* is a manual feeder 44 that feeds, for example, thick articles to ANTs 12.

Figure 7:
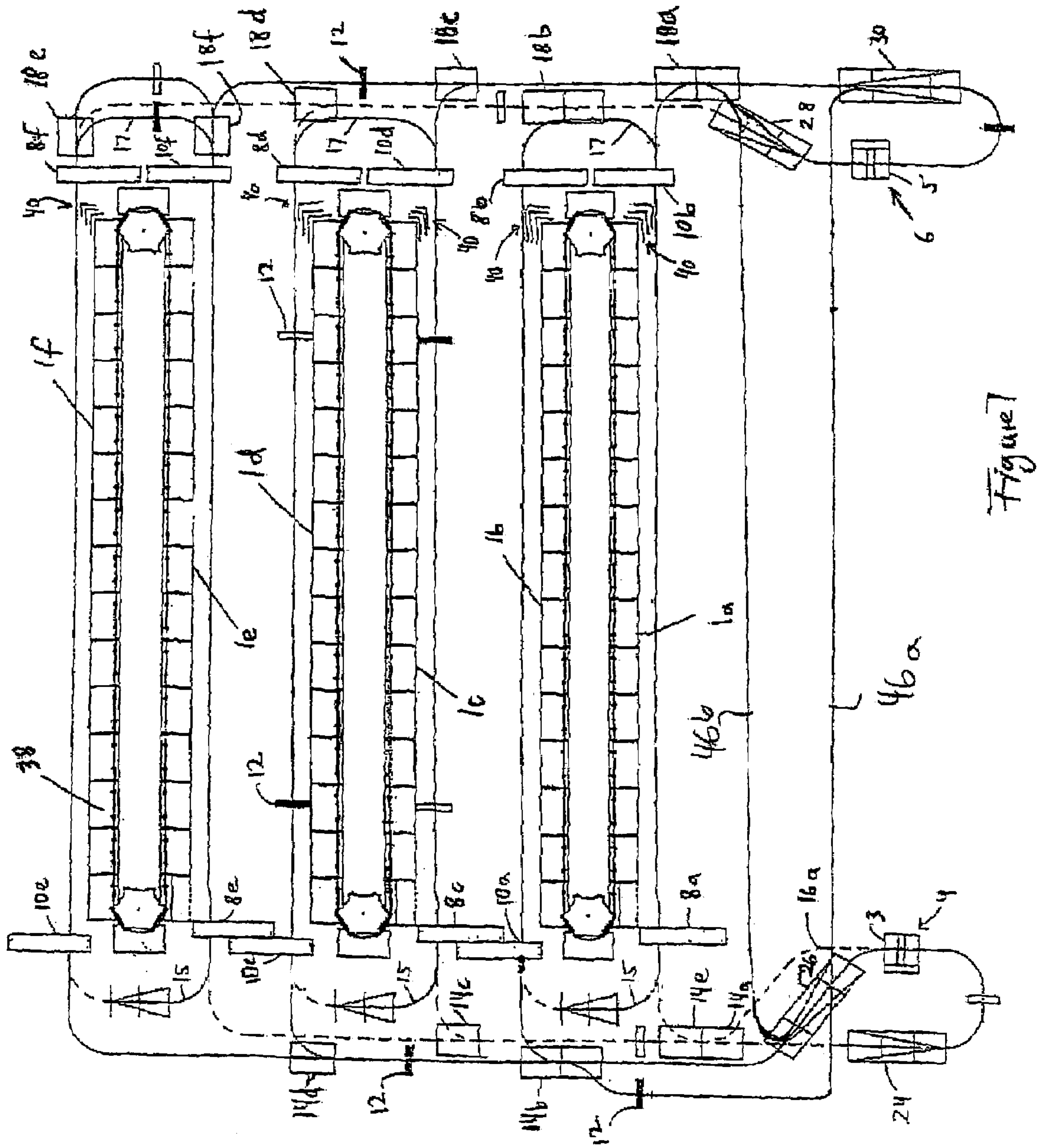
FIG. 7 illustrates one embodiment of a schematic mail processing system implementing the structure illustrated in FIG. 4.

FIG. 7 illustrates one embodiment of a schematic mail processing system implementing the structure illustrated in FIG. 4. The embodiment of FIG. 7 corresponds mostly to the embodiment of FIG. 6. In addition, the embodiment of FIG. 7 includes by-pass paths 46*a*, 46*b*. In the illustrated embodiment, the by-pass path 46*a* extends between the ramp 3 next to the feeder 3 and the switch 14*b*. The by-pass path 48*b* extends between the ramp 16*a* next to the feeder 3 and the switch 18*a*. As described with reference to FIG. 4, the by-pass paths 46*a*, 46*b* in FIG. 7 are for loaded ANTs 12 that carry articles having destination addresses that are not within a casing tower the ANT 12 would normally travel to first. For example, an ANT 12 loaded by the feeder 5 would normally travel to one of the casing towers 1*a*, 1*c*, 1*e* first, but now travels along the by-pass path 46*a* to approach first one of the casing towers 1*b*, 1*d*, 1*f*. An ANT 12 loaded by the feeder 5 travels correspondingly along the by-pass path 46*b*. For a general description of the system and those elements common to the embodiments of FIGS. 6 and 7, reference is made to the above description of FIG. 6.

Figure 8:
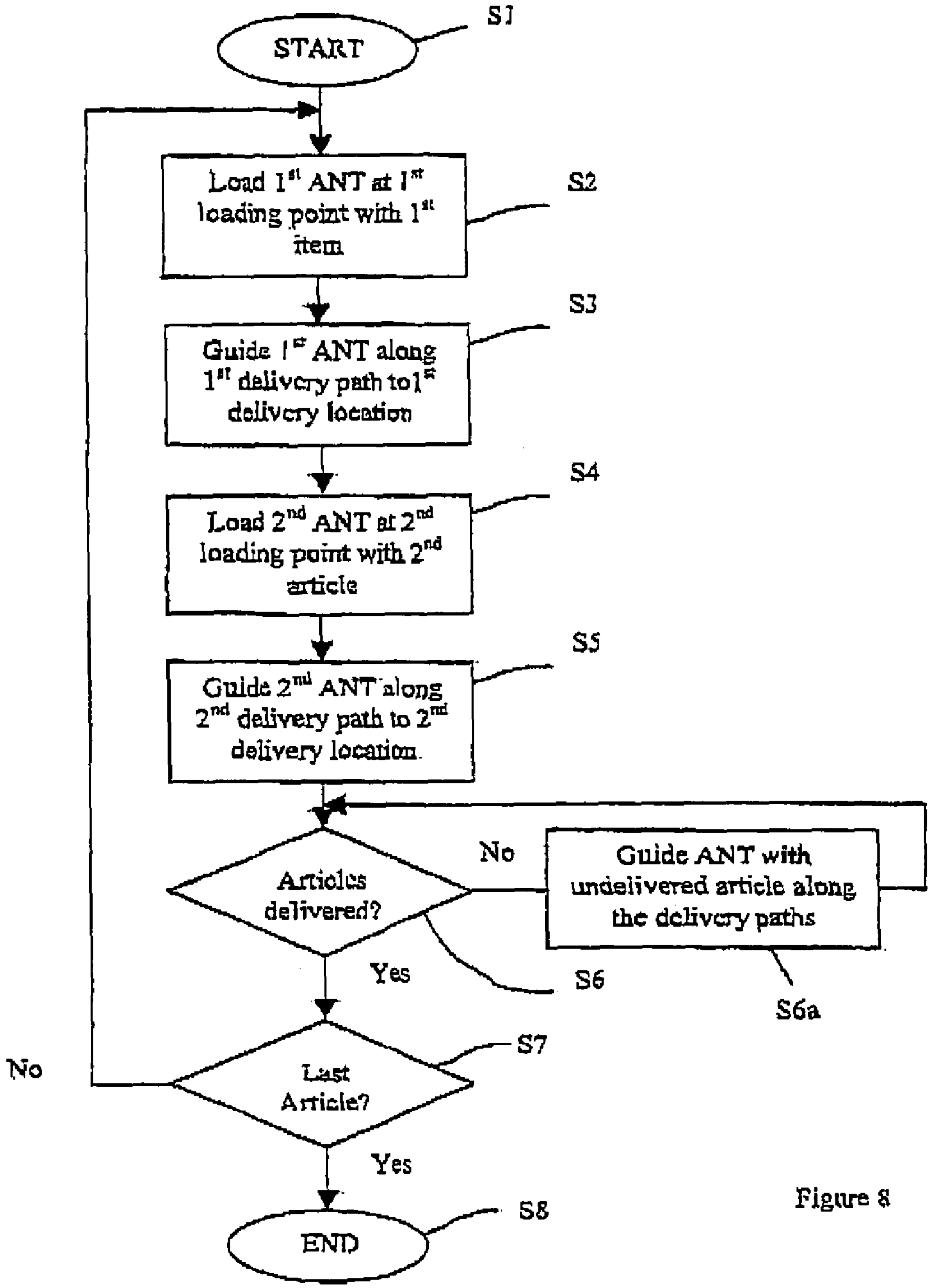
FIG. 8 illustrates one embodiment of a method of delivering articles to delivery locations within a mail processing system.

FIG. 8 illustrates one embodiment of a method of delivering articles to delivery locations within a mail processing system. The method starts at a step S1. At this time, all mail that arrived at the postal services' processing site by its cut-off time (e.g., 6 pm) will be processed for that day. The articles arrive at the feeders 3, 5 in trays and are automatically, or in exceptional cases manually loaded to the feeders 3, 5.

In a step S2, a first ANT 12 is loaded with a first article at a loading point 4. The destination address for that article is known. The ANT 12 available at the loading point 4 receives from the feeder 3 the first article and its destination address.

In a step S3, the ANT 12 with the first article is guided along the first delivery path to a predetermined first delivery location. The ANT 12 processes the destination address of the first article and travels along the first delivery path that leads to the first delivery location specified by the destination address.

Steps S4 and S5 correspond to the steps S2 and S3, i.e., in step S4, a first ANT 12 is loaded with a second article at a second location 6, and in step S5, the ANT 12 with the second article is guided along the second delivery path to a predetermined second delivery location.

In a step S6, the method determines if all articles have been delivered to the predetermined delivery locations. If yes, the method proceeds along the YES branch to a step S7. If an ANT 12 has not delivered the article, the method proceeds along the NO branch to a step 6*a* and bypasses its respective loading point 4, 6. In step 6*a*, the ANT 12 proceeds along a delivery path until the article can be delivered.

In the step S7, the method determines if the last article has been delivered. If there are still articles in the queue, the method proceeds along the NO branch to step S2. If the last article has been delivered, the method proceeds along the YES branch to a step S8 and the method ends.

It is contemplated that inserting and guiding the articles occurs in one embodiment asynchronously. That is, each feeder 3, 5 loads the ANTs 12 at its own operational speed, and the ANTs 12 begin traveling along their delivery paths as soon as the articles are loaded. Each ANT 12 according to one embodiment is an independent vehicle with its own controller so that the ANT 12 knows, for example, how to travel and when to wait for another ANT 12.

Within such a system, the delivery paths are optimized in that the lengths of the paths the ANTs 12 have to travel is minimized. As a result of the minimized path lengths the number of ANTs 12 within the system can be reduced. The reduced number of ANTs 12, in turn, leads to improved efficiency, availability and reliability (e.g., improved mean-time between failure, MTBF) and to reduced operating costs. Further, such a system requires only two levels for the track path.

As indicated above, the ANT 12 is autonomous vehicle designed to carry one article from one of two loading points and deliver it to one of many delivery point slots. To perform this task the ANT 12 includes communications equipment that provides for communications between the ANT 12 and the system acting as a host. The transport system moves the ANTs 12 within the mail processing system. Within the transport system the ANTs 12 travel on a track system. In one embodiment, the track system is based on a monorail that serves as a railway for the ANTs 12. The track system includes switches that allow the ANTs 12 to change from one rail path to another. For example, as the ANT 12 approaches a switch it sends a signal to the switch that indicates the desired direction. The switch "knows" its own switch position, processes the indicated direction and changes its switch position, if necessary, to divert the ANT 12 to the appropriate rail.

The transport system includes further the divert elevators 10*a*, 10*b*, 10*c*, 10*d*. Each divert elevator moves an ANT 12 to one of the levels of the casing tower arrangements 1*a*, 1*b*, 1*c*, 1*d* so that the ANT 12 can make a delivery to one of the destination slots. Similar to the switches, the ANT 12 approaches an elevator and signals its destination level. The ANT 12 has to wait to board the elevator. Once the ANT 12 is on board, the elevator indexes vertically one level and stops to allow other ANTs 12 to board or exit as necessary. In one embodiment, the elevator moves up, except when an ANT 12 enters on level 2 or 3 and needs to go down to level 1 or 2.

In addition, the transport system includes the merge elevators 8*a*, 8*b*, 8*c*, 8*d*. After delivering the articles, the ANTs 12 accumulate at the exit of the casing tower arrangements 1*a*, 1*b*, 1*c*, 1*d*. At this point, all ANTs 12 have the same destination, i.e., to get back to the feeder section. In one embodiment, each merge elevator accepts up to four ANTs 12 per level and indexes up. At levels 5 and 6 of the casing tower arrangements 1*a*, 1*b*, 1*c*, 1*d* the ANTs 12 are instructed to exit.

It is apparent that there has been disclosed a mail processing system and a method of delivering articles to predetermined delivery locations within the mail processing system that fully satisfies the objects, means, and advantages set forth hereinbefore. While specific embodiments of the system and method have been described, it is evident that many alternatives, modifications, and variations will be apparent to those skilled in the art in light of the foregoing description.

The invention claimed is:

1. A method of delivering articles to predetermined delivery locations within a mail processing system, comprising:

loading, a first transport vehicle at a first loading point with a first article;

guiding the first transport vehicle along a first delivery path towards a first delivery location;

loading a second transport vehicle at a second loading point with a second article;

guiding the second transport vehicle along a second delivery path towards a second delivery location;

determining if the first transport vehicle delivers the first article at the first delivery location and if the second transport vehicle delivers the second article at the second delivery location;

guiding the first transport vehicle to the second loading point if it delivered the first article at the first delivery location, and the second transport vehicle to the first loading point if it delivered the second article at the second delivery location, and guiding the first transport vehicle to the second delivery location if it did not deliver the first article at the first delivery location, and the second transport vehicle to the first delivery location if it did not deliver the second article at the second delivery location.

2. The method of claim 1, wherein the first and second loading points are at different locations within the mail processing system.

3. The method of claim 1, wherein guiding the first transport vehicle to the second delivery location if it did not deliver the first article at the first delivery location includes by-passing the second loading point, and wherein guiding the second transport vehicle to the first delivery location if it did not deliver the second article at the second delivery location includes by-passing the first loading point.

4. The method of claim 1, further comprising vertically diverting the first and second transport vehicles.

5. The method of claim 1, further comprising vertically merging the first and second transport vehicles.

6. The method of claim 1, further comprising re-circling the first and second transport vehicles if an article cannot be delivered.

7. The method of claim 1, further comprising sorting exception articles using an exception line.

8. A method of delivering articles to predetermined delivery locations within a mail processing system, comprising:

inserting a first article at a first loading point into a first delivery path, and a second article at a second loading point into a second delivery path;

transporting the first and second articles towards the first and second delivery locations, respectively;

by-passing the first delivery location if the first delivery location does not include a destination address that corresponds to an address of the first article; and by-passing the second delivery location if the second delivery location does not include that corresponds to an address of the second article.

9. The method of claim 8, further comprising transporting the first article to the second delivery location after by-passing the first delivery location, and the second article to the first delivery location after by-passing the second delivery location.

10. The method of claim 8, further comprising by-passing the first loading point after by-passing the second delivery location, and by-passing the second loading point after by-passing the first delivery location.

* * * * *